United States Patent
Kolb, III

[19]

[11] Patent Number: 5,808,196
[45] Date of Patent: Sep. 15, 1998

[54] BLOCKING ROTOR AND HOUSING FOR FLOW METER

[75] Inventor: William J. Kolb, III, Zion, Ill.

[73] Assignee: Liquid Controls L.L.C., Lake Bluff, Ill.

[21] Appl. No.: 726,385

[22] Filed: Oct. 4, 1996

[51] Int. Cl.⁶ .................................................. G01F 3/00
[52] U.S. Cl. ............................................ 73/253; 418/196
[58] Field of Search ........................... 73/253, 254, 255, 73/259; 418/169, 170, 196

[56] References Cited

U.S. PATENT DOCUMENTS

| | | | |
|---|---|---|---|
| 791,147 | 5/1905 | Green | 418/196 |
| 1,395,114 | 10/1921 | Jackman | 418/196 |
| 2,859,699 | 11/1958 | Billeter | 418/196 |
| 3,255,630 | 6/1966 | Karlby et al. | 73/253 |
| 3,304,781 | 2/1967 | Stevenson | 73/253 |
| 3,457,835 | 7/1969 | Siebold | 73/261 |
| 3,465,683 | 9/1969 | Blomgren | 73/253 |
| 5,513,529 | 5/1996 | Kolb, III | 73/253 |

FOREIGN PATENT DOCUMENTS

| | | | |
|---|---|---|---|
| 207037 | 11/1955 | Australia | 418/196 |
| 579832 | 7/1959 | Canada | 73/253 |

*Primary Examiner*—Ronald L. Biegel
*Attorney, Agent, or Firm*—Patnaude Videbeck & Marsh

[57] ABSTRACT

A fluid flow meter has a housing within which inlet and outlet displacement rotors flank a blocking rotor. The end plates of the housing rotatably support all three rotors which rotate in a timed sequence in response to the passage of fluid through the meter. The cylindrical blocking rotor has a pair of disk-shaped endwalls joined by a rectangular, centrally-positioned web, and a pair of arcuate sidewalls which, with the endwalls and web define a pair of rotor cavities. Recesses in the housing end plates fit the blocking rotor endwalls and provide an added fluid seal. Use of the rotor endwalls makes it possible to manufacture the blocking rotor with a smaller diameter and thinner body portions, saving weight and rotational mass.

10 Claims, 8 Drawing Sheets

BLOCKING ROTOR AND HOUSING FOR FLOW METER

BACKGROUND OF THE INVENTION

This invention relates to improvements in positive displacement fluid flow meters, and more particularly to a blocking rotor and meter housing for such meters.

Industrial fluid flow meters, such as those used in the petrochemical and natural gas industries, are generally the reverse of a positive displacement pump. That is, the fluid, flowing through a gasoline storage tank facility, gasoline transport truck, underground natural gas delivery system, or other storage or delivery system, generally has a positive displacement meter connected in line in the fluid delivery system such that movement of fluid, whether gas or liquid, through the delivery line causes movement of the rotors in the meter which drives a mechanical or electrical counting device to measure precisely the volume of flow through the delivery system. Such a meter is described in detail in U.S. Pat. No. 5,513,529, assigned to the assignee of the present invention. As set forth in the '529 patent, another typical industrial meter is a plastic rotary fluid displacement meter suitable for use in the food industry is disclosed at U.S. Pat. No. 3,465,683.

The meter described in the '529 patent has a housing defining a generally trefoil-shaped cavity within which a trio of rotors are rotatably mounted, a pair of displacement rotors flanking a blocking rotor. As the blocking rotor rotates, it combines with first one displacement rotor then the other to close off a part of the cavity to define a flow path along which the fluid must pass, thereby rotating the displacement rotors and creating a motion that can be correlated to fluid volume passing through the meter, making it possible to translate the rotation of the displacement rotor into a meter reading showing fluid volume flow. Meters of this type are also described in U.S. Pat. Nos. 3,457,835 and 3,465,683, also assigned to the predecessor of the assignee of the present invention.

Typically, the entire fluid flow through a conduit is diverted through the flow meter in order to provide a flow rate reading. Because of this, it is desirable that the meter add as little flow impedance as possible to minimize energy losses and to maintain as high a flow rate as possible. To that end, it is desirable to provide a flow meter with movable components of as little mass as possible while maintaining sufficient strength for a long and accurate service life.

It is also desirable to provide housings for flow meters that are as compact as possible. For minimizing pressure loss, minimizing a retention of fluid in the meter, and for ease of installation and flexibility of location and orientation when placed in service.

A continuing need then exists to provide flow meters of the type utilizing blocking rotors with rotors of lightweight yet strong construction. A further need exists for rotor housings designed to complement the improved blocking rotor design while providing a compact and low profile construction with minimum pressure loss.

SUMMARY OF THE INVENTION

The invention resides in an improvement of a rotary fluid displacement device of the type having a housing within which a pair of displacement rotors are rotatably mounted within a fluid chamber, and a blocking rotor positioned between the displacement rotors. The invention resides in an improved additionally elongated blocking rotor having walls that enclose the distal end and both sides of any displacement rotor blade as it rotates by the blocking rotor in a meter housing. Modified housing end caps include recesses to receive the ends of the blocking rotors. The invention is further found in an improvement wherein the blocking rotor has a relatively thin cross-section for overall weight reduction, maximum displacement rotor penetration, smallest possible blocking rotor displacement, and has circular end walls integrally formed therewith for improved structural rigidity. dr

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, wherein like reference numerals identify like elements throughout and in which:

DETAILED DESCRIPTION OF THE DRAWINGS

Figure 1:
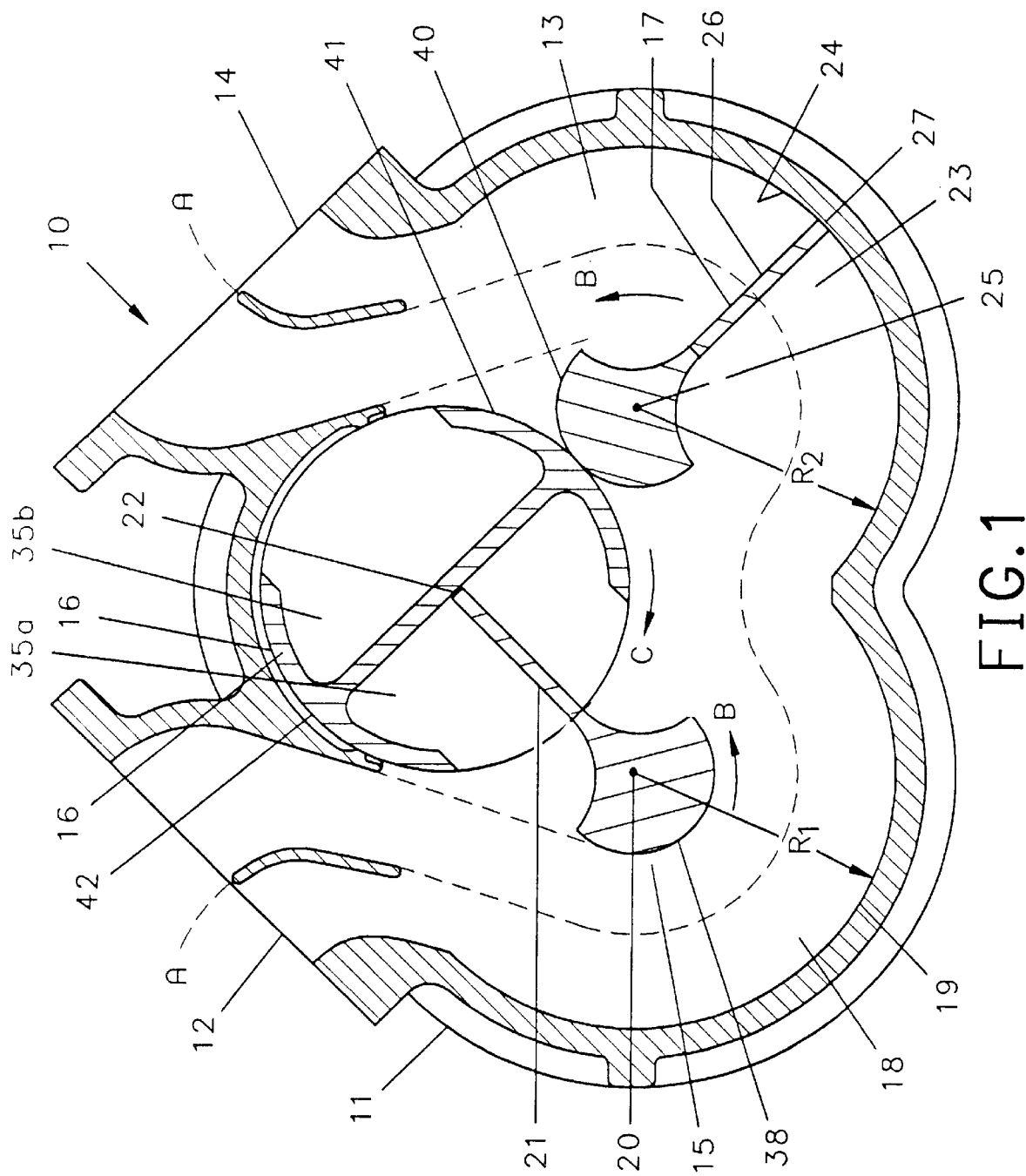
FIG. 1 is a lateral sectional view, constructed in accordance with the present invention, showing the placement of the displacement and blocking rotors within the meter housing.

Referring now to FIG. 1, the numeral 10 indicates generally a flow meter having a meter housing 11, an inlet port 12, a fluid chamber 13 and an outlet port 14. Disposed and rotatably supported within housing 11 are inlet displacement rotor 15, blocking rotor 16 and outlet displacement rotor 17.

Housing 11 is of a generally trefoil shape, with a first arcuate chamber 18 with a curved inner surface 19 having a radius of curvature $R_1$ measured from the axis of rotation 20 of rotor 15. As seen in FIG. 1, rotor 15 has a generally rectangular vane 21 extending normal to axis 20 and terminating in a vane end 22. Preferably, the distance between axis 20 and vane end 22 approximates $R_1$, allowing vane end 22 to "wipe" along inner surface 19 during rotation of rotor 15. This wiping contact helps to keep fluid from leaking past vane 15 during its rotation. In like fashion, a second arcuate chamber 23 is formed proximate outlet port 14 having an inner surface 24 with a radius of curvature $R_2$ as measured from an axis 25 of rotor 17. A generally rectangular vane 26 extends normal to axis 25 and terminates at a vane end 27, with the distance from axis 25 to vane end 27 approximating $R_2$, allowing end 27 to wipe along surface 24.

Figure 5:
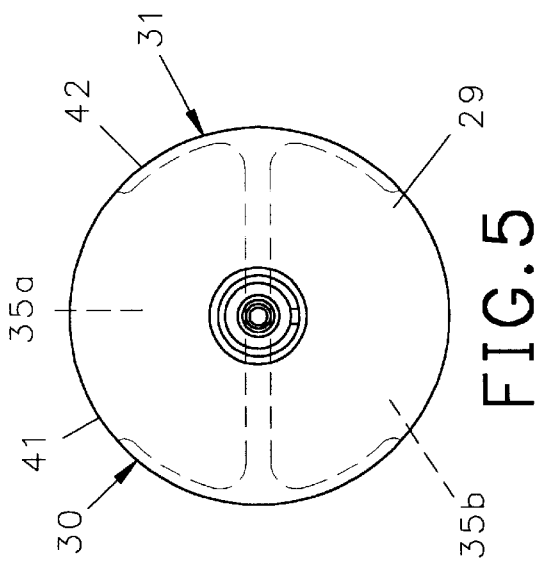
FIG. 5 is a right end elevational view of the blocking rotor of FIG. 2.
Figure 2:
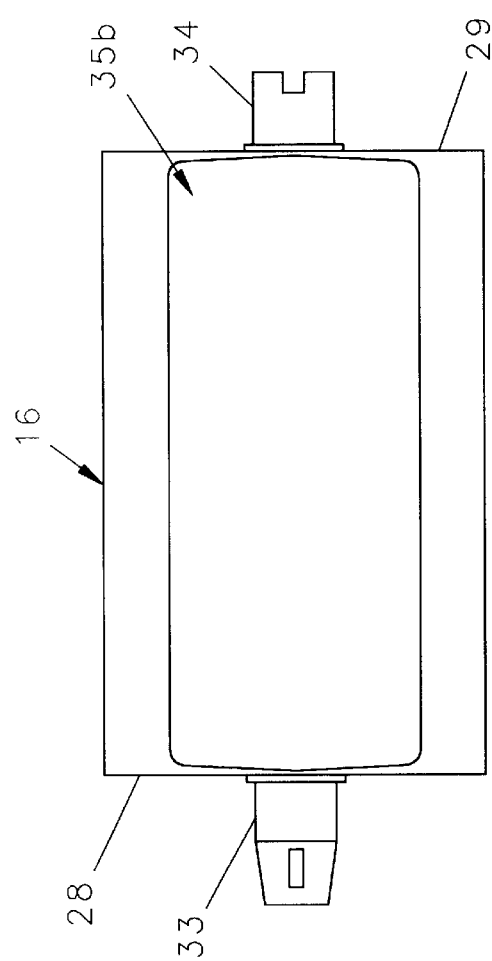
FIG. 2 is a top plan view of the blocking rotor of FIG. 1.

As seen in FIGS. 1–5, blocking rotor 16 constructed in accordance with the present invention is formed in a generally cylindrical configuration having first and second circular end walls 28 and 29 between which extend a pair of arcuate, substantially quarter-round side walls 30 and 31 parallel one to the other and an interior, generally rectangular web 32 joined integrally to end walls 28 and 29 and to side walls 30 and 31, bisecting said side walls as seen in FIG. 5. Web 32, end walls 28 and 29, and side walls 30 and 31 combine to define a pair of rotor cavities 35a and 35b, as seen in FIG. 5. Web 32, as it extends between end walls 28 and 29, is longer than the length of vanes 21 and 26 of displacement rotors 15 and 17 for reasons discussed in more detail below. Use of end walls 28 and 29 allows web 32 and side walls 30 and 31 to be made relatively thin in cross-section, producing a blocking rotor with not only reduced mass and, thereby, reduced resistance to rotation, but with increased structural rigidity as well.

End wall 28 has a journal 33 formed thereon, while end wall 29 has a journal 34 formed thereon, said journals rotatably supporting blocking rotor 16 within housing 11 as described below. As seen, journal 33 is longer than journal 34.

Figure 6:
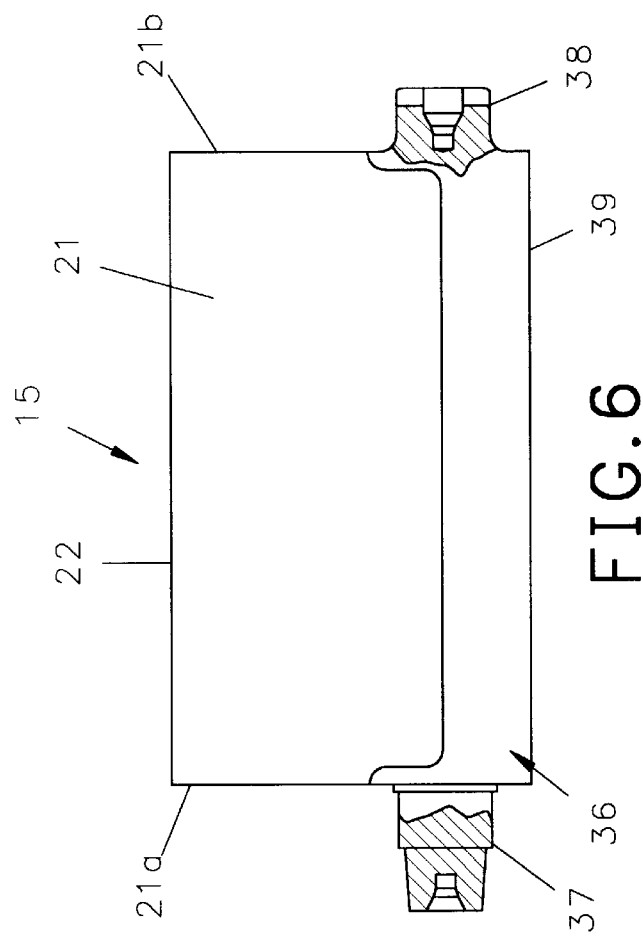
FIG. 6 is a blade-on elevational view of one of the displacement rotors of FIG. 1 with portions of the opposing end journals shown in section.
Figure 7A:
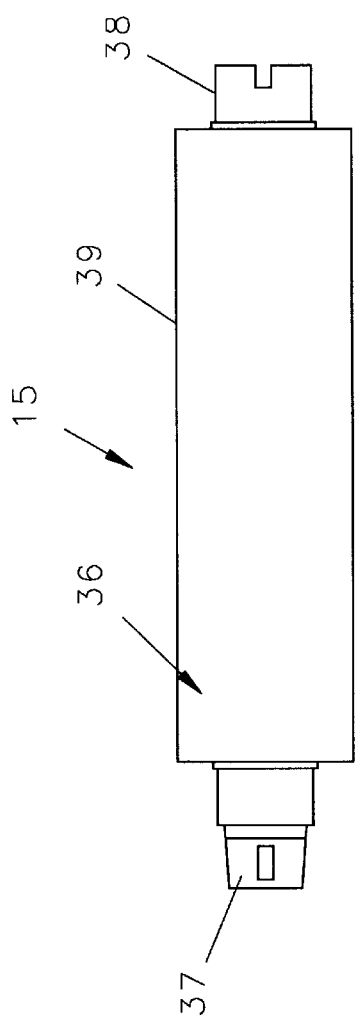
FIG. 7a is a bottom plan view of the rotor of FIG. 6.
Figure 7:
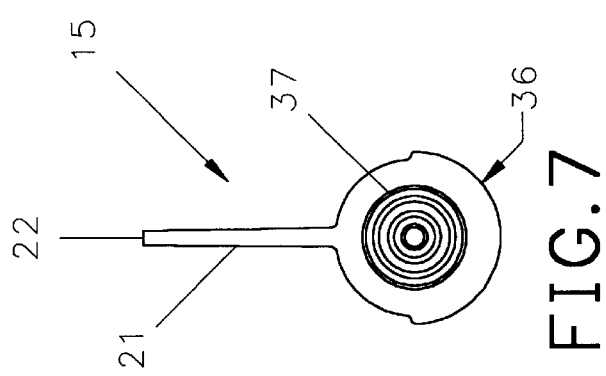
FIG. 7 is an end-on elevational view of the rotor of FIG. 6.

Referring now to FIGS. 6, 7 and 7a, displacement rotor 15 is illustrated in detail, it being understood that in a preferred embodiment of the present invention, displacement rotors 15 and 17 are identical in construction and the following description of rotor 15 is also descriptive of rotor 17. Details of the structure and function of displacement rotors in general may be found in U.S. Pat. Nos. 3,457,835 and 3,465,683, owned by the predecessor of the assignee of the present application.

Rotor 15 consists of a rotor hub 36 formed integrally with vane 21 and a pair of rotor journals 37 and 38 formed at opposite ends of hub 36. Journals 37 and 38 rotatably support rotor 15 within housing 11 as described below and, as seen in FIGS. 6, 7 and 7a, journal 37 is longer than journal 38.

Figure 4:
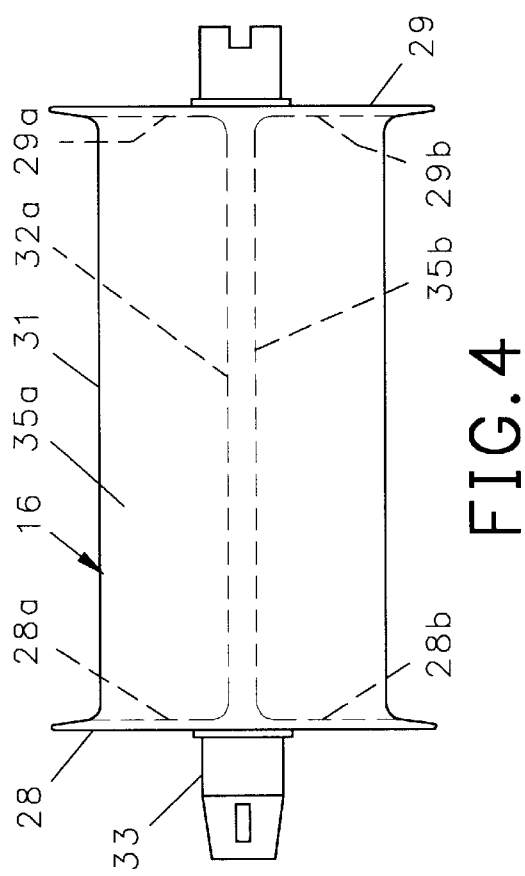
FIG. 4 is a front elevational view of the blocking rotor of FIG. 2.

Rotor hub 36 is generally semi-circular in cross-sectional configuration, with each displacement rotor having a curved outer surface (surface 39 of rotor 15 and surface 40 of rotor 17) as best seen in FIG. 1. In like fashion, each sidewall 30 and 31 of blocking rotor 16 also has a curved outer surface (41 and 42, respectively) which successively contact and roll against outer surfaces 39 and 40 in a manner to be described below. To that purpose, hub 36 is shaped and dimensioned to contact outer sidewall surfaces 41 and 42 when rotors 15 and 17 are installed in housing 11. The axial length of vane 21 is such that vane 21 fits inside blocking rotor cavities 35a and 35b, with vane side surfaces 21a and 21b wiping, respectively, inner end wall surfaces 28a. 28b, 29a and 29b, and web surfaces 32a and 32b as seen in FIGS. 4, 8 and 9.

Figure 8:
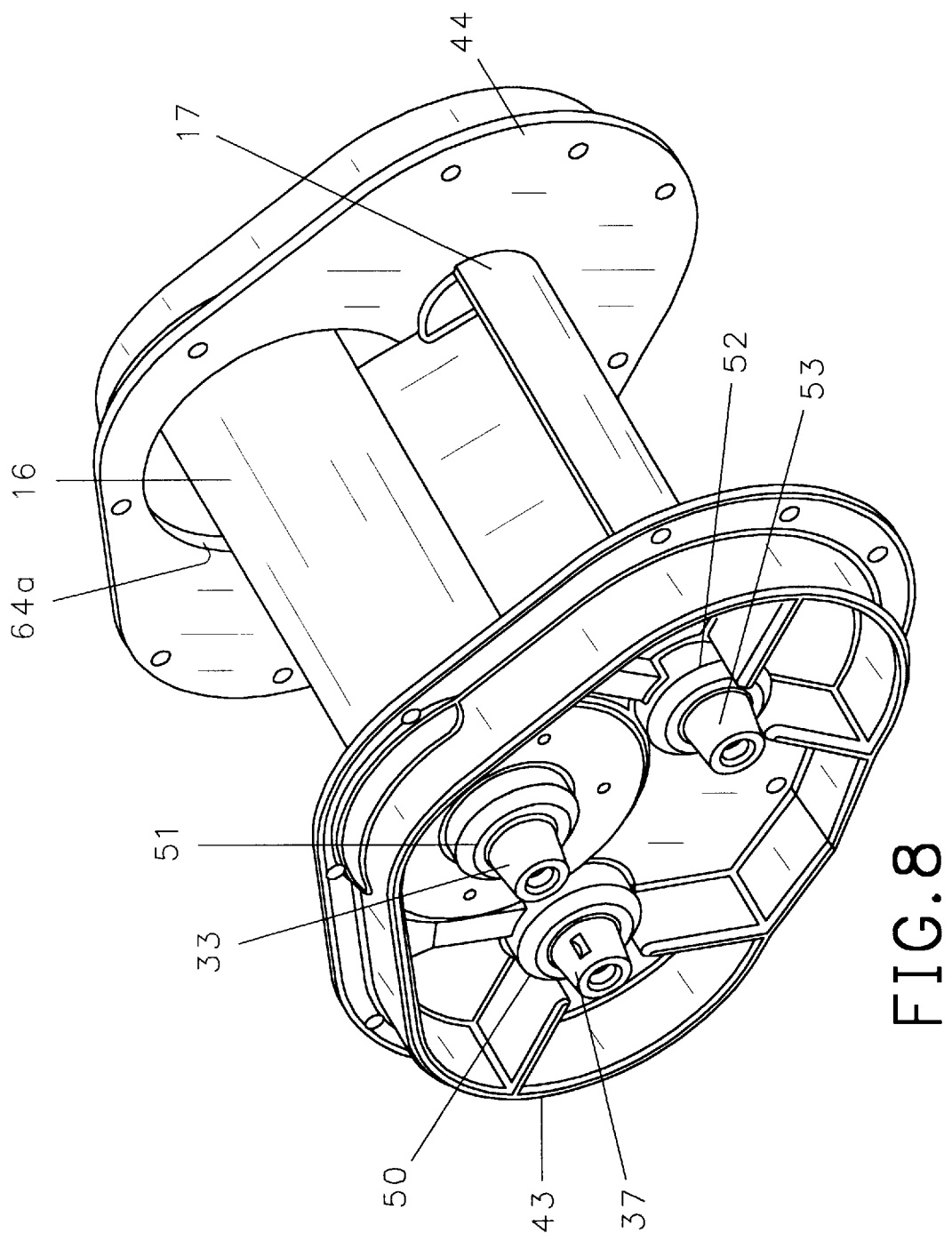
FIG. 8 is a perspective view of the first and second housing end plates assembled to the displacement and blocking rotors of FIG. 1.
Figure 9:
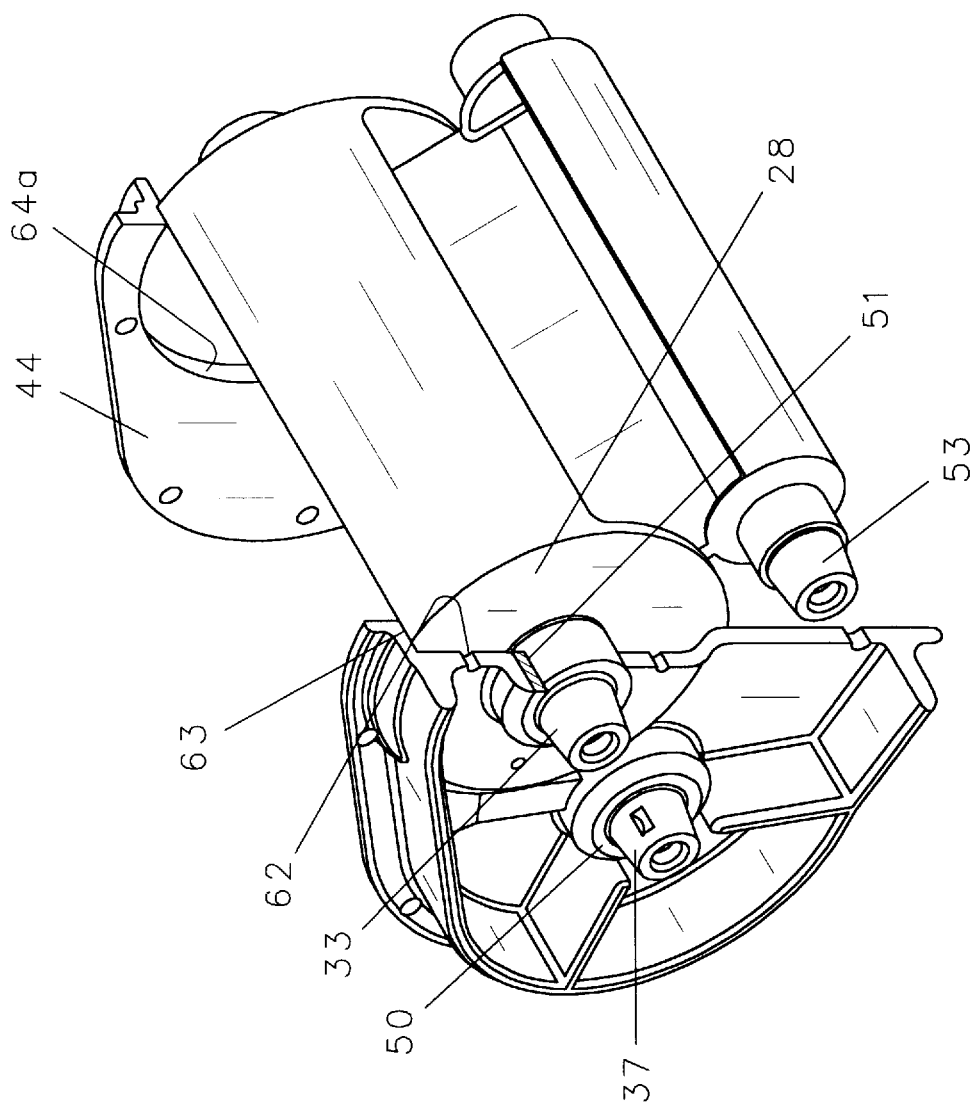
FIG. 9 is a partial perspective view of the assembly of FIG. 8.

Referring now to FIGS. 8 and 9, details of housing 11 and the mounting of rotors 15, 16 and 17 are illustrated. Shown in FIG. 8 are first housing end plate 43 and second housing end plate 44 assembled to support blocking rotor 16 and displacement rotors 15 (not visible) and 17. For purposes of illustration, the remaining portions of housing 11 have been omitted to allow details of the rotor placement and assembly to be observed. In service, housing 11 completely and fluid-tightly encloses the rotor assemblies. In FIG. 9, a portion of end plate 43 has been removed to illustrate the details of how blocking rotor 16 is mounted within housing 11.

Figure 11:
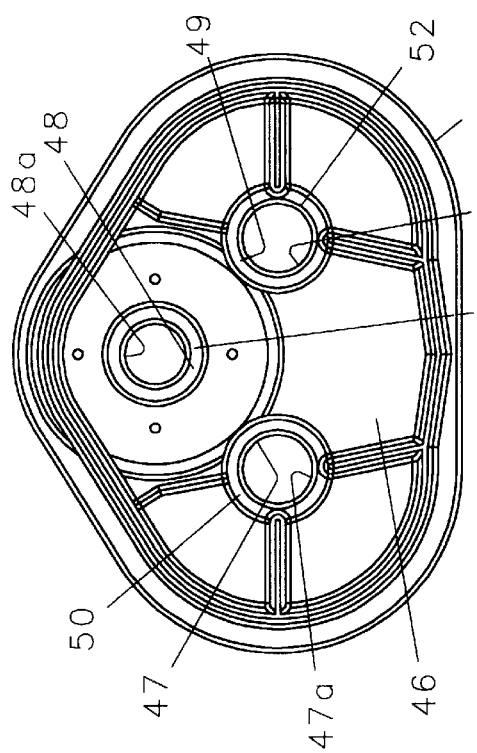
FIG. 11 is a front elevational view of the exterior of the first housing end plate of FIG. 10.
Figure 10:
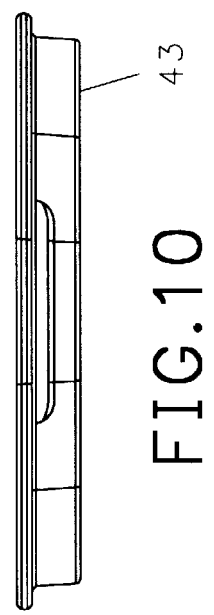
FIG. 10 is an edge-on view representative of both housing end plates of FIG. 8.
Figure 12:
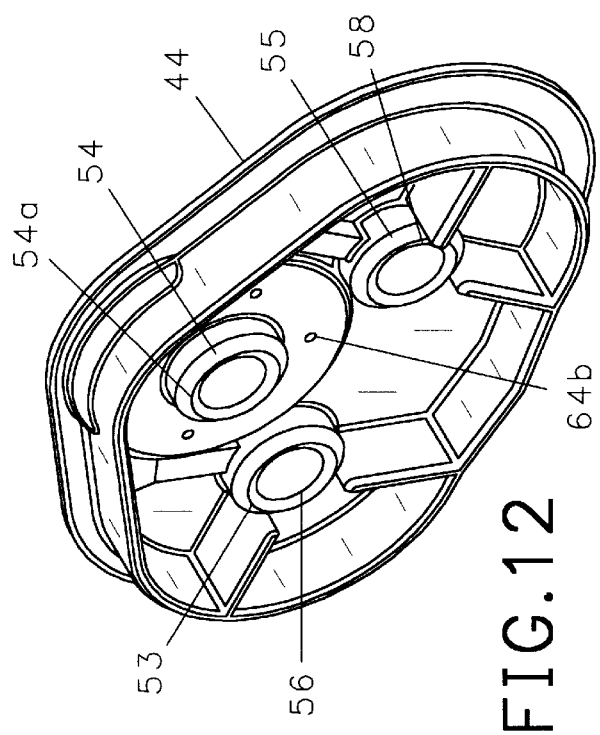
FIG. 12 is a perspective view of the exterior of the second end plate of FIGS. 8 and 9.

Preferably, end plates 43 and 44 are identical and interchangeable, and end plate 43 will be described in detail, it being understood that the same configuration and structure is present in end plate 44 as well. As seen in fuller detail in FIGS. 10, 11 and 13, end plate 43 has an interior working surface 45 and an exterior surface 46. Formed on each end plate 43 are bearing support structures 47, 48 and 49, with apertures 47a and 49a therethrough within which are mounted, respectively, bearings 50, 51 and 52 (FIGS. 8 and 9). In FIG. 12, it can be seen that end plate 44 has bearing support structures 53, 54 and 55 formed thereon, with bearings 56, 57 and 58, respectively, inserted into the bearing apertures.

As seen in FIG. 8, bearing 50 rotatably supports journal 37 of inlet displacement rotor 15, bearing 51 rotatably supports journal 33 of blocking rotor 16, and bearing 52 rotatably supports journal 59 of outlet displacement rotor 17 (note that journal 59 corresponds in size and configuration to journal 37). In like fashion, end plate 44 rotatably supports blocking rotor journal 34 in bearing 57, while inlet displacement rotor journal 38 is rotatably supported by bearing 56 and outlet rotor journal 59 (not herein shown, but identical to inlet displacement rotor journal 38) is rotatably supported by bearing 58.

Figure 13:
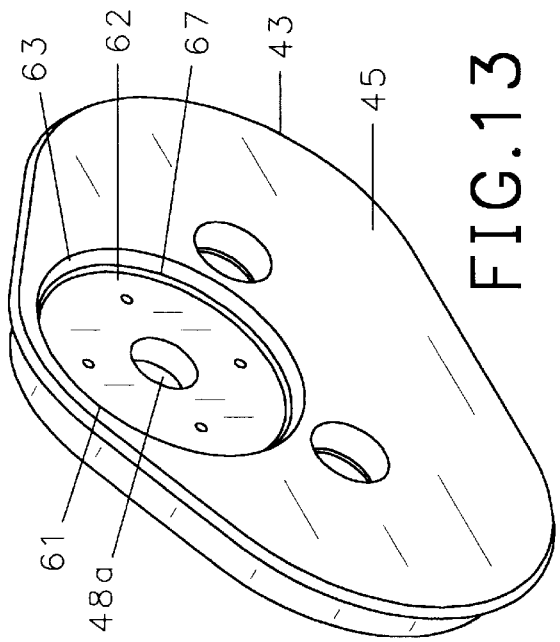
FIG. 13 is a perspective view representative of the interior of both end plates of FIG. 10.

FIG. 13 illustrates interior work surface 45 of end plate 43, it being understood that end plate 44 has an identically configured work surface referred to for convenience as work surface 60. As seen in FIG. 13, in another aspect of the present invention, a cylindrical recess 61 is formed as part of end plate 43 with a face 62 and a sidewall 63 that extend "below" or are set into work surface 45. An identically configured recess 64 is formed in end plate 44. Recesses 61 and 64 are concentric with, respectively, bearing apertures 48a and 54a and are sized to enclose the opposing end walls 28 and 29 of blocking rotor 16. The opposing cylindrical surfaces 63 on end plate 43, 64a on end plate 44 (FIGS. 8 and 9) and 30–31 plus the outer portions of end walls 28 and 29 form fluid seals between the blocking rotor 16 and the end plates 43, 44, respectively. Within limits, the rotor 16 is allowed to float along its axis and holes such as 64b on plate 44 (FIG. 12) receive any pressure buildup between the end plate recess 64 and the rotor end wall 28.

Referring to FIGS. 1, 4, 6, 8 and 9, the operation and arrangement of meter 10 may now be described. Fluid entering meter 10 via inlet 12 moves along flowpath A to impinge upon vane 21 of inlet displacement rotor 15, rotating rotor 15 about axis 20 in direction B. Rotors 15, 16 and 17 rotate in a timed sequence, with blocking rotor 16 rotating in direction C, to allow vane 21 to enter, sweep through and clear cavity 35a. As rotor 15 sweeps through cavity 35a, the vane side surfaces 21a, 21b closely pass along the inside surfaces 28a, 29a of endwalls 28 and 29.

Although the vane and cavity surfaces are rotating in opposite angular directions, during a part of the time vane 21 is in cavity 35a, the linear directions of their movements temporarily approximate one another. For example, as seen in FIG. 1, although blocking rotor 16 is rotating clockwise and inlet displacement rotor 15 is rotating counterclockwise, vane 21 and cavity 35a are both moving toward inlet 12. The relative movement between vane side 21a and cavity side wall surface 28a is very small during that portion of their rotation. This similar relative movement provides for more efficient passage of fluid through the meter than heretofore known.

As seen in FIG. 1, when vane 21 is fully within cavity 35a, arcuate hub 40 of outlet displacement rotor 17 contacts and rolls along arcuate web sidewall outer surface 41 as rotor 17 rotates about axis 25 in direction B. As flow continues, vane 21 clears cavity 35a as blocking rotor 16 rotates to bring outer surface 41 into contact with the outer arcuate surface 39 of rotor 15. During this sequence, rotor 17 rotates to bring vane 26 into cavity 35b. As can be appreciated, continued flow serves to repeat the foregoing sequence, with vanes 21 and 26 intermittently entering, sweeping through and clearing cavities 35a and 35b. The presence of blocking rotor 16 and the close movement of vane ends and sides 21a, 21b and 27, respectively, along respective cavity side surfaces 28a, 29a, 28b and 29b, the close movement of end wall rims 65 and 66 along sidewalls 63 of recesses 61 and 64, the close movement of blocking rotor end walls 28 and 29 along faces 62 of recesses 61 and 64 and the rolling movement of rotor hub surfaces 39 and 40 along blocking rotor outer surfaces 41 and 42 keeps the process fluid substantially confined to and moving forward along flow path A from inlet 12 to outlet 14 in a more efficient and less restrictive manner than heretofore known.

Figure 14:
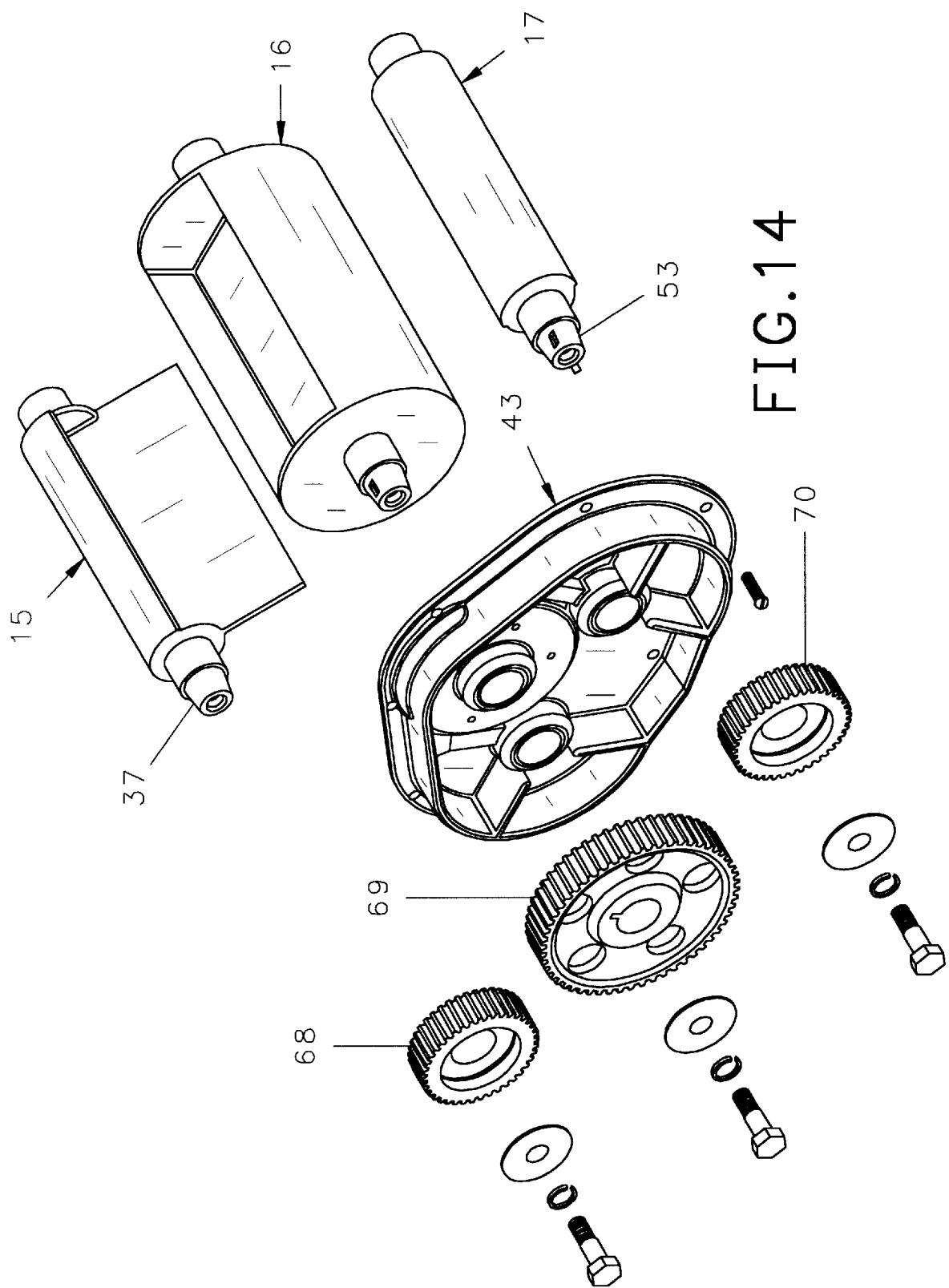
FIG. 14 is an exploded perspective view of the exterior of the first end plate of FIG. 10 showing the rotor timing gears on the outer side of the end plate, and the blocking rotor of FIG. 2 and displacement rotors of FIG. 6 on the inner side of the end plate.

Timed rotation of rotors 15, 16 and 17 is described in U.S. Pat. Nos. 3,457,835 and 3,465,683 and is accomplished in the present invention as seen in FIG. 14 by mounting a timing gear 68 to journal 37 of inlet displacement rotor 15 as journal 37 protrudes through bearing 50, mounting a timing gear 69 to blocking rotor journal 33 as it protrudes through bearing 51 and mounting a timing gear 70 to journal 53 of outlet displacement rotor 17 as it protrudes through bearing 52. Rotation of rotors 15, 16 and 17 are kept in timed sequence to prevent jamming of vanes 21 and 26 with blocking rotor 16.

As can clearly be seen when comparing FIG. 1 in this application with FIG. 1 in the aforementioned U.S. Pat. No. 5,513,529, the diameter of the blocking rotor has decreased relative to the radial length of the displacement rotor blades. As a consequence, the housing has a lower profile than housings of prior trefoil cavity type positive displacement meters or pumps. In the embodiments shown in FIG. 1 and FIG. 5 of the '529 patent, with the blocking rotor and displacement rotor blade being of the same axial length, the radial length of the displacement rotor blade is limited by the radial dimension of the blocking rotor hub. Those two dimensions add up to the distance between the displacement rotor axis and the blocking rotor axis.

In the present embodiment of the invention, with the blocking rotor being longer than the displacement rotor, the radial length of the displacement rotor blade is limited only by one half the thickness of the blocking rotor web. In other words, the radial length of the displacement rotor blade may extend to the blocking rotor axis minus one half the blocking rotor web thickness. The blocking rotor journals and adjacent strengthening structures are now positioned completely axially outwardly of the displacement rotor blade so they are no longer a limitation on radial blade length.

As one can see in FIG. 1, the other dimensions which must add up to the perpendicular distance between the blocking rotor axis and the displacement rotor axis, are the hub radius of the displacement rotor and the blocking rotor radius. The sums of each of those two sets of dimensions must be equal. Given these design limitations, both the displacement rotor hub radius and the radial blade length may be increased if the blocking rotor radius and web thickness are correspondingly decreased. Therefore, the positive displacement device of the invention has a smaller blocking rotor diameter than found in such heretofore known devices.

Figure 15:
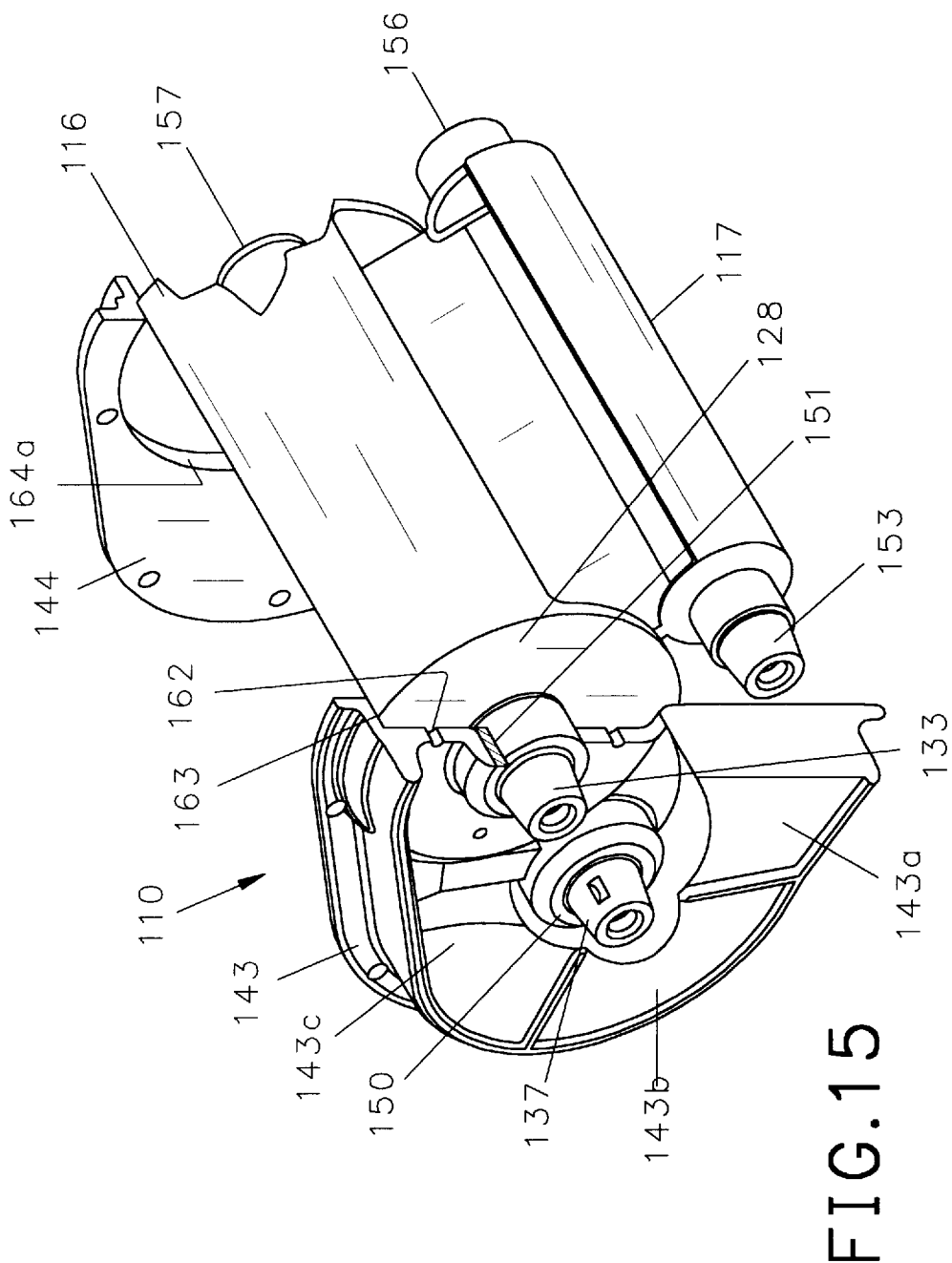
FIG. 15 is a perspective view, with portions cut away, of a second embodiment of the meter of the invention.

Referring to FIG. 15, a second embodiment of the meter of the invention is generally indicated at 110 with the housing removed for clarity. In this second embodiment, the meter is rotated 90 degrees for mounting with the axes of the displacement rotor 17 and blocking rotor 16 positioned vertically. In this orientation the top and bottom end plates 143, 144 have differing thicknesses of construction for differing reasons. First, in order to lessen rotor drag, the top bearings 150, 151, 152 (not shown) are ball or needle bearings. The bottom bearings, such as shown at 156 are bushings as in the first embodiment. The rotors are mounted vertically in the housing by means of shims such as shown at 157 positioned between the rotor and the bottom end plate. The bushings 156, etc., are more able to withstand a dirtier environment at the bottom of the meter caused by any sediment in the fluid. The ball bearings 150, 151, etc., perform well and longer with less drag in the cleaner environment at the top of the meter.

Figure 3:
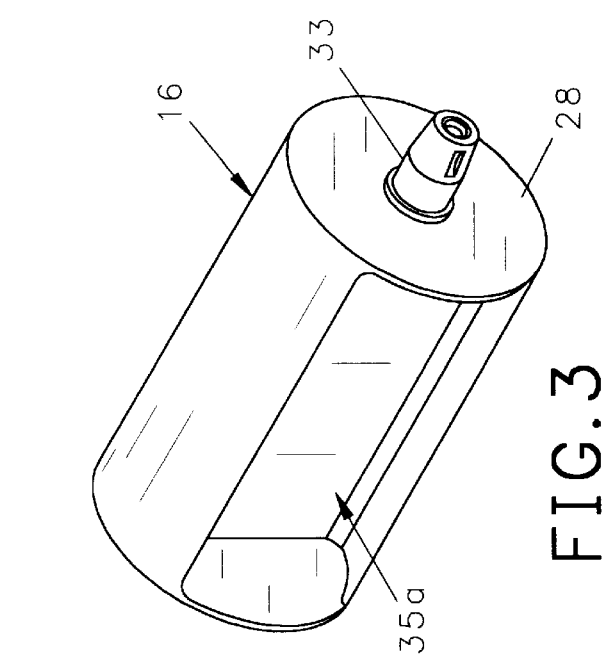
FIG. 3 is a perspective view of the blocking rotor of FIG. 2.

Additionally, in order to prevent or lessen any potential for contamination if differing fluids are passed through the meter at differing times, the amount of fluid retained in the meter outside of the normal fluid flow path must be minimized. For example, such events may occur in commercial tank transport trucks carrying differing grades of gasoline at differing times. Fluid may be retained in the meter between the end plates 143, 144 and end covers (not shown) that are mounted over the end plates. Such end covers are shown in FIG. 3 at 12 and 13 of U.S. Pat. No. 5,513,529 issued to the predecessor of the assignee of the present invention, and are incorporated herein by reference. Since the bottom end plate 144 does not have gears mounted thereadjacent, the spaces where those gears would have been needed to be filled in on the end plate. Also, an end cover may be reshaped to lessen the size of or eliminate any cavity in the bottom of the meter.

At the top of the meter, the wall thickness of end plate 143 should be increased and the spaces denoted at 143a, 143b, 143c on the top of end plate 143 should be filled in to closely surrounds the gears (not shown) when they are mounted on journals 133, 137, 153. The top end cover may also be modified to eliminate internal cavities. In this manner, most of the cavity space in the end plates will be eliminated and the amount of residual fluid in the meter will be substantially lessened. The meter will be easier to flush or clear and the purity of fluids passed therethrough will also be enhanced.

While the foregoing has presented a description of two embodiments of the present invention, it is to be understood that this description is presented by way of example only and is not intended to limit the scope of the present invention. It is expected that others skilled in the art will perceive variations which, while differing from the foregoing, do not depart from the spirit and scope of the invention as herein described and claimed.

What is claimed:

1. A blocking rotor for a rotary fluid displacement device, said device of the type having at least one displacement rotor, said blocking rotor being a one-piece unified structure comprising:

a generally hollow cylindrical body including opposing circular end walls and diametrically opposing substantially quarter-round arcuate side walls extending between said end walls defining opposing substantially quarter-round side wall openings in said generally hollow cylindrical body; a diametrical interior web extending between and substantially bisecting said opposed substantially quarter-round arcuate side walls and between said opposing circular end walls; a pair of opposing journals, each positioned externally of respective ones of said opposing circular end walls coaxially therewith.

2. The blocking rotor as defined in claim 1 wherein said diametrical interior web includes opposed flat side surfaces extending between said opposing circular end walls defining opposing semicylindrical pockets in said body, and for providing clearance for any displacement rotor sweeping through one of said semicylindrical pockets.

3. The blocking rotor as defined in claim 1 wherein each of said opposing end walls include a pair of substantially flat semicircular inside surfaces for providing clearance for any displacement rotor sweeping through one of said semicylindrical pockets.

4. In an end plate for use on a trefoil cavity type housing for a rotary fluid displacement device, said end plate of the type having a generally flat working surface, a pair of displacement rotor mounting apertures formed perpendicularly through said end plate in spaced relation to each other and a blocking rotor mounting aperture formed perpendicularly through said end plate positioned equidistant from said pair of displacement rotor mounting apertures in spaced triangular relation thereto; and improvement comprising:

a cylindrical recess on said substantially flat working surface, said blocking rotor mounting aperture positioned on an end wall of said cylindrical recess and being coaxial therewith, said cylindrical recess being for receiving an end segment of a blocking rotor having a disk-shaped end wall with an inside surface of said end wall being co-planar with said substantially flat working surface.

5. In a rotary fluid displacement device of the type including a housing having a trefoil shape cavity therein, a pair of vaned displacement rotors mounted in spaced relation in said housing for rotary movement in like direction therein, and a blocking rotor mounted for rotary movement in triangulated relation to said pair of displacement rotors, said blocking rotor comprising:

a generally hollow cylindrical body including opposing circular end walls and diametrically opposing substantially quarter-round arcuate side walls extending between said end walls defining opposing substantially quarter-round side wall openings in said generally hollow cylindrical body; a diametrical interior web extending between and substantially bisecting said opposed substantially quarter-round arcuate side walls and between said opposing circular end walls; said diametrical web and said quarter round arcuate sidewalls defining opposing semicylindrical pockets on said blocking rotor, the length of said semicylindrical pockets being greater than the length of said displacement rotor vanes for providing clearance when said displacement rotors sweep through respective ones of said semicylindrical pockets.

6. The rotary fluid displacement device as defined in claim 5 further including a pair of end plates mountable on opposed open ends of said housing, each said end plate including:

a generally flat working surface, a pair of displacement rotor mounting apertures formed perpendicularly through each end plate in spaced relation to each other and a blocking rotor mounting aperture formed perpendicularly through each said end plate positioned equidistant from said pair of displacement rotor mounting apertures in spaced triangular relation thereto;

a cylindrical recess on said substantially flat working surface, said blocking rotor mounting aperture positioned on an end wall of said cylindrical recess and being coaxial therewith, said cylindrical recess being for receiving an end segment of said blocking rotor that is axially longer than the length of a vane of one of said displacement rotors with an interior surface of said end segment of said blocking rotor being co-planar with said generally flat working surface.

7. The rotary fluid displacement device as defined in claim 5 further including a pair of end plates mountable on opposed open ends of said housing, each said end plate including:

a generally flat working surface, a pair of displacement rotor mounting apertures formed perpendicularly through each end plate in spaced relation to each other and a blocking rotor mounting aperture formed perpendicularly through each said end plate positioned equidistant from said pair of displacement rotor mounting apertures in spaced triangular relation thereto;

a cylindrical recess on said substantially flat working surface, said blocking rotor mounting aperture positioned on an end wall of said cylindrical recess and being coaxial therewith, said cylindrical recess being for receiving an end segment of said blocking rotor that is axially longer than the length of a vane of one of said displacement rotors, and said cylindrical recesses includes at least one vent hole positioned therethrough for receiving any fluid buildup between an end wall of said blocking rotor and said cylindrical recess.

8. The rotary fluid displacement device as defined in claim 5 further including a pair of end plates mountable on opposed open ends of said housing, each said end plate including:

a generally flat working surface, a pair of displacement rotor mounting apertures formed perpendicularly through each end plate in spaced relation to each other and a blocking rotor mounting aperture formed perpendicularly through each said end plate positioned equidistant from said pair of displacement rotor mounting apertures in spaced triangular relation thereto;

a cylindrical recess on said substantially flat working surface, said blocking rotor mounting aperture positioned on an end wall of said cylindrical recess and being coaxial therewith, said cylindrical recess being for receiving an end segment of said blocking rotor that is axially longer than the length of a vane of one of said displacement rotors, and a substantial seal is formed between an outer circumference of a circular end wall on one end of said blocking rotor and an inner cylindrical surface on said cylindrical recess on one of said pair of end plates.

9. In a rotary fluid displacement device of the type including a housing having a trefoil shape cavity therein, a pair of vaned displacement rotors positioned in spaced relation in said housing for rotary movement in like direction therein, a blocking rotor mounted for rotary movement in triangulated relation to said pair of displacement rotors, and a pair of opposing end plates for covering the opposing sides of said trefoil shape cavity on said housing and for rotatably mounting the ends of said pair of vaned displacement rotors and said blocking rotor, respectively; thereon, an improvement comprising, a radius of a hub of said displacement rotor plus a radius of said blocking rotor are substantially equal to a radial length of a blade of said displacement rotor plus one-half the thickness of a web on said blocking rotor, wherein a thickness of said web on said blocking rotor is substantially thinner than a diameter of a journal on said blocking rotor.

10. In a rotary fluid displacement device of the type including a housing having a trefoil shape cavity therein, a pair of vaned displacement rotors positioned in spaced relation in said housing for rotary movement in like direction therein, a blocking rotor mounted for rotary movement in triangulated relation to said pair of displacement rotors, drive means adjacent one end of each of said rotors for continuing the relative rotary movement therebetween, a pair of opposing end plates for covering the opposing sides of said trefoil shape cavity on said housing and for rotatably mounting thereon the ends of said pair of vaned displacement rotors and the end of said blocking rotor, respectively, and two end covers for mounting on opposing sides of said housing and covering each of said end plates, and said drive means adjacent one of said end plates, an improvement comprising, said end plates and said two end covers including substantially complementary mating surfaces for substantially minimizing any voids around said ends of said rotors and said drive means.

* * * * *